United States Patent [19]
Neeley et al.

[11] Patent Number: 5,405,079
[45] Date of Patent: Apr. 11, 1995

[54] METHOD OF PROVIDING AUXILIARY HEAT DURING PRIMARY HEAT PUMP LOCK-OUT

[75] Inventors: Timothy A. Neeley; Kevin D. Thompson, both of Indianapolis, Ind.

[73] Assignee: Carrier Corporation, Syracuse, N.Y.

[21] Appl. No.: 89,793

[22] Filed: Jul. 8, 1993

[51] Int. Cl.$^6$ .............................................. F25B 29/00
[52] U.S. Cl. .................................. 237/2 B; 236/1 E; 165/29
[58] Field of Search ................. 237/2 B; 236/10, 1 E; 62/324.1, 238.6

[56] References Cited

U.S. PATENT DOCUMENTS

| 4,517,807 | 5/1985 | Harnijh | 237/2 B |
| 4,703,795 | 11/1987 | Beckey | 165/29 |
| 5,095,715 | 3/1992 | Dudley | 237/2 B |

FOREIGN PATENT DOCUMENTS 0007497  2/1980  European Pat. Off. .............. 165/29

Primary Examiner—Henry A. Bennett

[57] ABSTRACT

In a heating system with a plurality of heat sources, wherein at least a first heat source is normally activated at a first, higher ambient temperature and at least one additional heat source is normally activated at a second, lower ambient temperature, a method for maintaining a desired comfort level in a comfort zone when the first heat source is deactivated comprising the steps of: recognizing that the first heat source is deactivated; and initiating at least one of the additional heat sources when the first, higher ambient temperature is reached.

7 Claims, 1 Drawing Sheet

METHOD OF PROVIDING AUXILIARY HEAT DURING PRIMARY HEAT PUMP LOCK-OUT

BACKGROUND OF THE INVENTION

This invention relates to the operation of a thermostat system having a primary heat source, such as a heat pump and an auxiliary heat source. More specifically, this invention relates to the provision of heat at the desired comfort setting using such a system's auxiliary heat source.

Presently, it is known in the art to provide a heating system having two independent sources of heat, to a comfort zone whose temperature is being controlled by the system. The use of such a two heat source system is desirable for a number of reasons. Thus, for example, in U.S. Pat. No. 4,293,092 to Hatz et al. a heating system is shown which uses a heat pump for primary heat, as well as an additional heat source which is self-contained and separate from the heating network of the building. This separate system uses mechanical power which is then converted to heat power and is transmitted as additional heat to the primary heat carrier.

Japanese Patent No. 55-118543 (A) to Fushimi shows the use of two heaters, wherein the auxiliary heater is operated only when the heating load is large. In this case, both the primary and auxiliary heater function simultaneously.

Japanese Patent No. 62-84246 to Miyajima concerns an auxiliary heater attached to a heat pump in an air conditioning system, the heater being used to prevent rapid lowering of the room temperature.

Japanese Patent No. 55-3523 to Karato, discloses a multi-chamber air conditioner with an auxiliary heater which is energized only when the heat load required in the room is high, as is determined by a strong signal.

Thus, it appears that in the past two mentioned instances, the auxiliary heater operates to insure sufficient heat as needed when large heating loads are required.

In German Patent No. 197,806 to Lennarz, a central heating unit having a boiler and heat pump contains a regulator with ambient air temperature sensors and a change-over switch. The change-over switch is actuated by the ambient temperature sensor and functions to change the source of heat when a predetermined temperature is achieved. Thus, a single thermostat can be used for both heat sources.

In European Patent 0,007,497 to Eisberg, assigned to a common assignee of the instant invention, discloses an energy saving system using a heat pump and furnace. The heat pump, which is more energy efficient when ambient temperature is close to the desired comfort temperature, is used during periods of relatively high ambient temperature; when the ambient temperature falls to the point where it becomes more economical to use the furnace, the furnace takes over the heating function.

The disclosures above all relate to normal anticipated operations of a heating system having two heat sources. In particular, it is now common, for the conservation of energy to have a system wherein a primary heat source is activated at higher ambient temperatures and a secondary heat source at lower ambient temperatures. However, this energy efficient method of operation can cause a problem.

At times, in operation, it is possible for the primary heat source, such as a heat pump system, to either be locked out or disabled. As used hereinafter, a "lock out" of the primary heat source occurs when such heat source is inoperable due to a system malfunction, such as a failure of a safety function, e.g. pressure switch current protector, etc. The term "disabled" is used to describe an event which has the effect of overriding the primary heat source operation which is not related to a system malfunction, e.g. the operation of an optimizer that switches control to the secondary heat source based on ambient temperature level.

In either case, the comfort level in the home or other comfort zone, would then have to be maintained by the second stage or auxiliary heat that is provided. However, the system, in order to operate under normal conditions, is set so that this auxiliary heat is energized at a lower ambient temperature than the temperature at which the heat pump would have been energized, had it been operating. Thus, under normal conditions, the temperature will be maintained, using only the auxiliary heat source, at a lower level or setting than was intended by the person setting the thermostat control. The desired comfort level will thus not be maintained.

OBJECTS AND SUMMARY OF THE INVENTION

It is therefore a primary object of the present invention to provide a method for maintaining the heating level in a comfort zone at the desired point when the heating system consists of a primary and auxiliary heat source.

It is another object of the present invention to provide a method for maintaining the heating level in a comfort zone at the desired point when the heating system consists of a primary and auxiliary heat source, in the case where the primary system is disabled.

It is another object of the present invention to provide a method for maintaining the heating level in a comfort zone at the desired point when the heating system consists of a primary and auxiliary heat source, in the case where the primary system is locked out.

These and other objects of the present invention are attained by, in a heating system with a plurality of heat sources, wherein at least a first heat source is normally activated at a first, higher ambient temperature and at least one additional heat source is normally activated at a second, lower ambient temperature, a method for maintaining a desired comfort level in a comfort zone when the first heat source is deactivated comprising the steps of: recognizing that the first heat source is deactivated; and initiating at least one of the additional heat sources when the first, higher ambient temperature is reached.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF A PREFERRED EMBODIMENT

Figure 1:
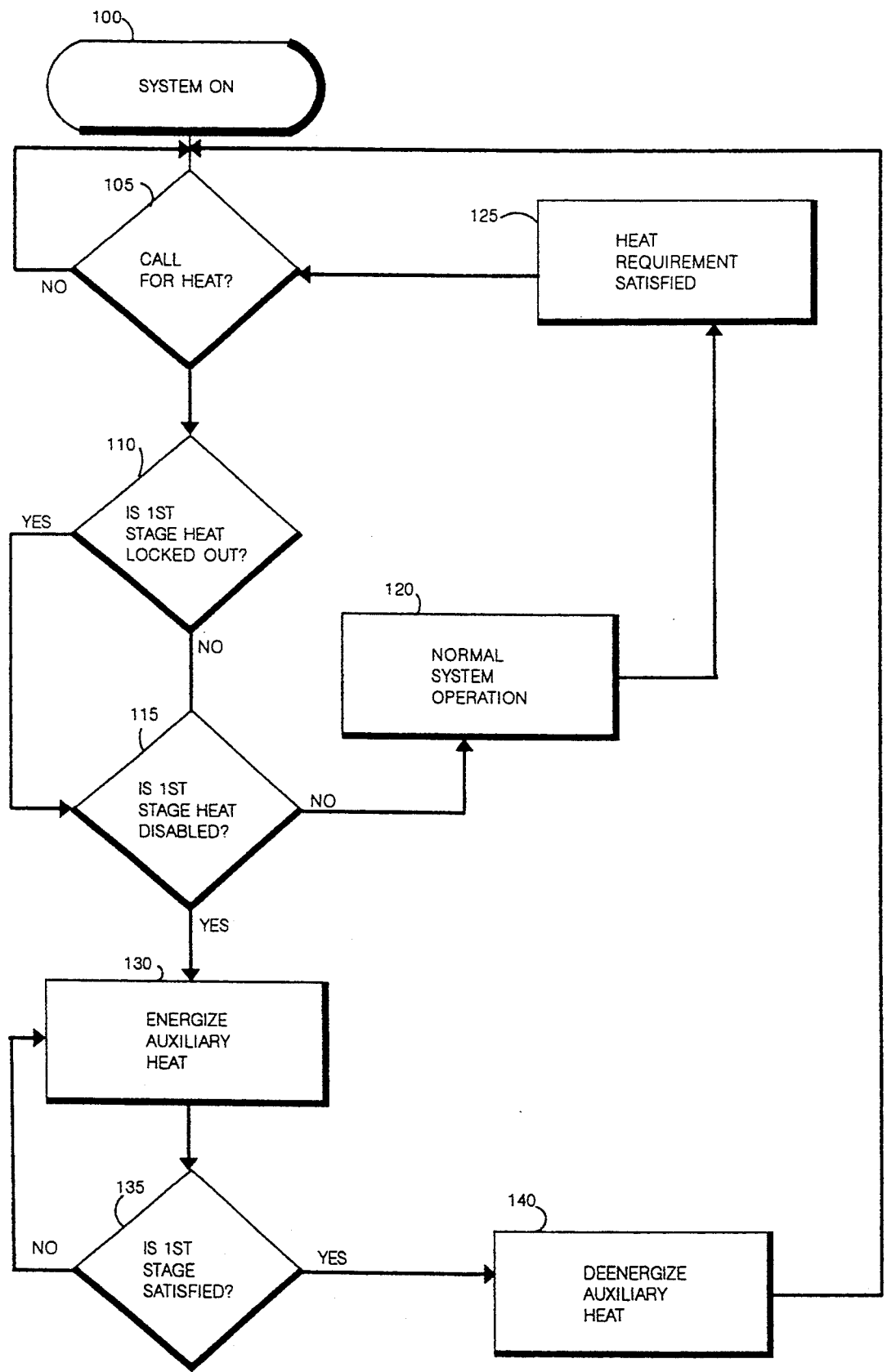
FIG. 1 represents a flow chart showing the operating logic of the instant invention.

Turning now to FIG. 1, the method for energizing the auxiliary heat at the desired comfort temperature when the heat pump system fails or is locked out can be better seen. In step 100 the system is turned on. Thereafter in step 105, the system is repeatedly queried as to whether or not there is a call for heat until such time as there is a call for heat. The call for heat will be recognized and relayed by a thermostat or the like.

When a call for heat is detected, then the system checks, in step 110 to see whether the first stage heat/primary heat source is locked out. If it is not locked out, then in step 115 a determination is made as to whether the first stage heat is disabled. If the first stage heat is not disabled, then normal system operation occurs as indicated in step 120 until such time as indicated, in step 125 that the heat requirement is satisfied. When that happens, the system returns to its state of waiting for a call from heat, step 105.

If, however, either the first stage heat is locked out or, as indicated in step 115, disabled, then in step 130 the auxiliary heat is energized. The system is then repeatedly queried in step 135 to determine whether the heat requirement of the first stage is satisfied. Once this requirement is met, then in step 140 the auxiliary heat is de-energized, and the system returns to step 105 awaiting a call for heat. If a lock out has occurred then normally a malfunction indicator (not shown) would be activated so that the system user would be alerted to the malfunction.

Operation in this mode provides the advantage, as already described herein, that when the primary heat source is deactivated and, thus, unavailable, the auxiliary heat source is activated at a higher ambient temperature than it would ordinarily be, so as to provide a desired comfort level to a comfort area. This is preferable to the systems of the prior art which then only provided sufficient heat to achieve a lower temperature, usually two degrees less than that desired for comfort.

This control of the comfort space at the desired temperature occurs whether the primary heat source is locked out due to system malfunction or disabled because the outside temperature is very low, or for other reasons. Furthermore, this method of control can be applied to multiple stage heating systems, and may be used with heat pump/furnace combinations, or multiple gas, oil or electric furnaces or boilers. It can also be applied to any multiple stage heating system.

While this invention has been explained with reference to the structure disclosed herein, it is not confined to the details set forth and this invention is intended to cover any modifications and changes as may come within the scope of the following claims:

What is claimed is:

1. In a comfort heating system with a plurality of heat sources, wherein at least a first heat source is normally activated at a first, higher comfort temperature demand level and at least one additional heat source is normally activated at a second, lower comfort temperature demand level, a method for maintaining a desired comfort temperature level in a comfort zone when said first heat source is deactivated comprising the steps of:
    recognizing that said first heat source is deactivated; and
    responsively initiating at least one of said additional heat sources when said first, higher comfort temperature demand level is reached.

2. In a comfort heating system with a primary heat source and an auxiliary heat source, wherein said primary heat source is normally activated at a first, higher comfort temperature demand level and said auxiliary heat source is normally activated at a second, lower comfort temperature demand level, a method for maintaining a desired comfort level in a comfort zone, when said primary heat source is deactivated comprising the steps of:
    recognizing that said primary heat source is deactivated; and
    responsively initiating said auxiliary heat source when said first, higher comfort temperature demand level is reached.

3. The method of claim 2 wherein said primary heat source is a heat pump.

4. The method of claim 2 wherein said auxiliary heat source is a furnace.

5. In a comfort heating system with a primary heat source and an auxiliary heat source, wherein said primary heat source is normally activated at a first, higher comfort temperature demand level and said auxiliary heat source is normally activated at a second, lower comfort temperature demand level, a method for maintaining a desired comfort level when said primary heat source is deactivated comprising the steps of:
    recognizing a call for heat;
    recognizing that said primary heat source is deactivated;
    responsively initiating said auxiliary heat source when said higher comfort temperature demand level is reached; and
    maintaining operation of said auxiliary heat source until the call for heat is satisfied.

6. The method of claim 2 comprising the further step of differentiating between deactivation due to malfunction of said primary system and deactivation due to desired functions of the system.

7. The method of claim 5 wherein recognizing a call for heat is performed by a thermostat.

* * * * *